United States Patent
Hvidsten (10) Patent No.: US 9,837,064 B1
(45) Date of Patent: Dec. 5, 2017

(54) GENERATING SPECTRALLY SHAPED SOUND SIGNAL BASED ON SENSITIVITY OF HUMAN HEARING AND BACKGROUND NOISE LEVEL

(71) Applicant: Cisco Technology, Inc., San Jose, CA (US)

(72) Inventor: Knut Inge Hvidsten, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/205,053

(22) Filed: Jul. 8, 2016

(51) Int. Cl.
| | |
|---|---|
| H04B 15/00 | (2006.01) |
| G10K 11/175 | (2006.01) |
| H04R 3/04 | (2006.01) |
| H04R 29/00 | (2006.01) |
| G10L 19/018 | (2013.01) |
| G10L 19/002 | (2013.01) |
| H04B 1/66 | (2006.01) |
| G10L 19/012 | (2013.01) |
| G10L 19/03 | (2013.01) |

(52) U.S. Cl.
CPC .......... *G10K 11/175* (2013.01); *H04R 3/04* (2013.01); *H04R 29/001* (2013.01); *G10L 19/002* (2013.01); *G10L 19/012* (2013.01); *G10L 19/018* (2013.01); *G10L 19/03* (2013.01); *H04B 1/665* (2013.01)

(58) Field of Classification Search
CPC ...... H04R 25/453; H04R 3/04; H04R 29/001; G10L 19/018; G10L 19/012; H04B 1/665; G10K 11/175

USPC ................. 381/94.1, 94.2, 73.1; 704/200.1, 704/E19.015, 201

See application file for complete search history.

(56) References Cited

U.S. PATENT DOCUMENTS

| | | | | |
|---|---|---|---|---|
| 5,490,170 A | * | 2/1996 | Akagiri | G10L 19/002 375/240 |
| 5,754,427 A | * | 5/1998 | Akagiri | G11B 20/00007 375/240 |
| 8,212,854 B2 | | 7/2012 | Marton et al. | |
| 8,505,054 B1 | | 8/2013 | Kirley | |

(Continued)

OTHER PUBLICATIONS

Kirovski, et al., "Spread-Spectrum Watermarking of Audio Signals," IEEE Transactions on Signal Processing, vol. 51, No. 4, Apr. 2003, pp. 1020-1030.

(Continued)

*Primary Examiner* — Vivian Chin
*Assistant Examiner* — Ubachukwu Odunukwe
(74) *Attorney, Agent, or Firm* — Edell, Shapiro & Finnan, LLC (57) ABSTRACT

A communication device includes a loudspeaker to transmit sound into a room. A signal having a white noise-like frequency spectrum spanning a frequency range of human hearing is generated. Auditory thresholds of human hearing for frequencies spanning the frequency range are stored. Respective levels of background noise in the room at the frequencies are determined. The white noise-like frequency spectrum is spectrally shaped to produce a shaped frequency spectrum having, for each frequency, a respective level that follows either the auditory threshold or the level of background noise at that frequency, whichever is greater. The shaped frequency spectrum is transmitted from the loudspeaker into the room.

19 Claims, 10 Drawing Sheets

(56) References Cited

U.S. PATENT DOCUMENTS

| | | |
|---|---|---|
| 9,036,825 B2 | 5/2015 | Nackvi |
| 2005/0063552 A1* | 3/2005 | Shuttleworth ........... H03G 3/32 |
| | | 381/57 |
| 2007/0286430 A1 | 12/2007 | Thomas et al. |
| 2011/0026724 A1* | 2/2011 | Doclo ................. G10K 11/178 |
| | | 381/71.8 |
| 2011/0150257 A1* | 6/2011 | Jensen ................. H04R 25/453 |
| | | 381/318 |
| 2016/0073198 A1 | 3/2016 | Vilermo et al. |

OTHER PUBLICATIONS

Geiger, et al., "Audio Data Hiding With High Data Rates Based on INTMDCT," 2006 IEEE International Conference on Acoustics Speech and Signal Processing Proceedings, May 2006, 4 pages.

Misra, et al., "Acoustical Ranging Techniques in Embedded Wireless Sensor Networked Devices," ACM Transactions on Sensor Networks, vol. 10, Issue 1, Nov. 2013, 40 pages.

\* cited by examiner

GENERATING SPECTRALLY SHAPED SOUND SIGNAL BASED ON SENSITIVITY OF HUMAN HEARING AND BACKGROUND NOISE LEVEL

TECHNICAL FIELD

The present disclosure relates to generating a spectrally shaped sound signal based on the sensitivity of human hearing and background noise levels.

BACKGROUND

A video conference system includes an endpoint device that exchanges audio-visual information with participants and their personal/user devices, such as smartphones, laptops, and the like, in a room during a conference session and transmits/receives such audio-visual information over a network to/from remote endpoint devices. Identifying those participants and their user devices that are in physical proximity to the endpoint device helps setup the conference session. "Pairing" is a means by which the endpoint device and each user device can ensure that they are in physical proximity to each other. Once the endpoint device and a given user device are paired, they may share confidential information during the conference session over a primary, secure (e.g., encrypted) channel between the devices. In one conventional pairing technique, the endpoint device generates and then transmits an ultrasonic signal as a proximity probe to user devices over a secondary channel. A disadvantage of this technique is that many user devices are not ultrasound capable, i.e., not configured to receive and process the ultrasound signal.

DESCRIPTION OF EXAMPLE EMBODIMENTS

Overview

An embodiment is implemented in a communication device having a loudspeaker to transmit sound into a room. A signal having a white noise-like frequency spectrum spanning a frequency range of human hearing is generated. Auditory thresholds of human hearing for frequencies spanning the frequency range are stored. Respective levels of background noise in the room at the frequencies are determined. The white noise-like frequency spectrum is spectrally shaped to produce a shaped frequency spectrum having, for each frequency, a respective level that follows either the auditory threshold or the level of background noise at that frequency, whichever is greater. The shaped frequency spectrum is transmitted from the loudspeaker into the room.

Example Embodiments

Figure 1:
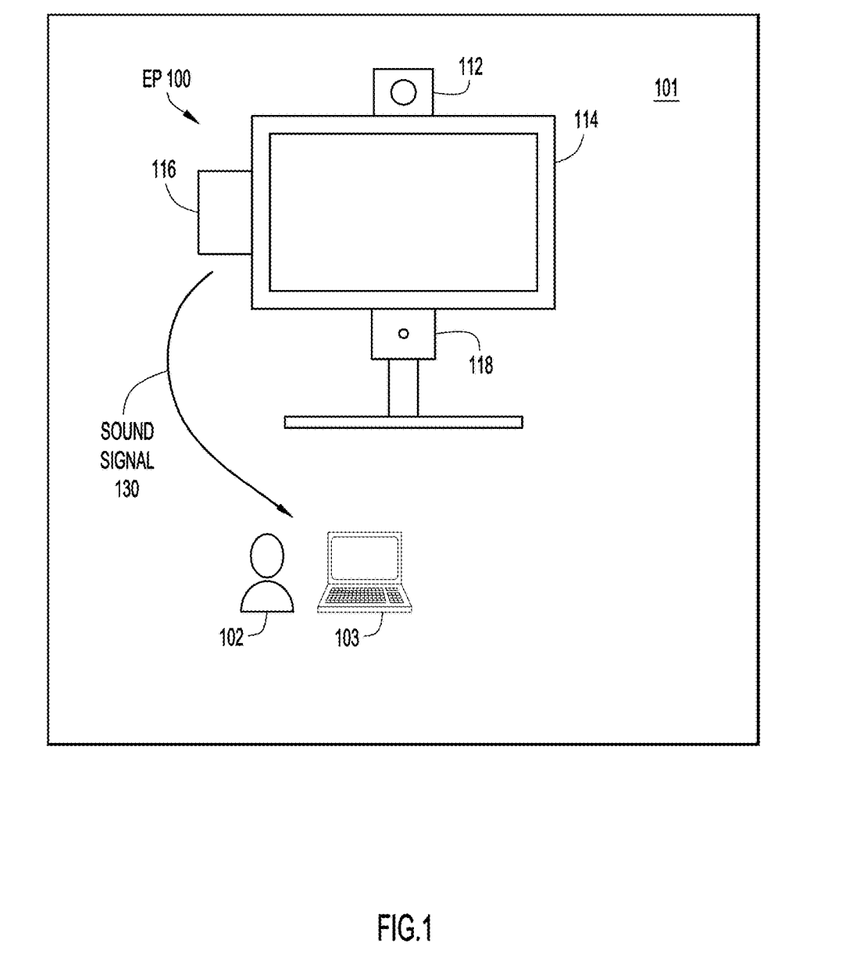
FIG. 1 is an illustration of a video conference (e.g., teleconference) endpoint device deployed in a room and in which embodiments directed to spectrally shaping a sound signal (e.g., a pairing signal) for transmission by the endpoint device may be implemented, according to an example embodiment.

With reference to FIG. 1, there is an illustration of a video conference (e.g., teleconference) endpoint (EP) device 100 (referred to simply as "endpoint" 100) in which embodiments directed to spectral (i.e., frequency spectrum) shaping of a sound signal transmitted by the endpoint device may be implemented. By way of example, endpoint 100 is depicted as being deployed in a room 101 (depicted simplistically as an outline) alongside a user 102 of the endpoint. Endpoint 100 is configured to establish audio-visual teleconference collaboration sessions with other video conference endpoints over a communication network (not shown in FIG. 1). User 102 may be equipped with a user device 103 to communicate with endpoint 100 proximate the user device over wired or wireless communication links with the endpoint. The term "proximate" means co-located at the same geographical location and within acoustic communication range. Typically, a user device is considered proximate a video conference endpoint when the two occupy the same room. User device 103 may be a wired or a wireless communication device capable of receiving, processing, storing, and/or communicating with endpoint 100, and may include, but are not limited to laptop and tablet computers, a smartphone, and the like.

Endpoint 100 may include a video camera (VC) 112, a video display 114, a loudspeaker 116 to transmit sound into room 106, and a microphone 118 to detect sound in the room. Loudspeaker 116 and microphone 118 may respectively transmit and detect sound in the frequency range of human hearing, i.e., in the range of frequencies perceptible to the human ear, typically considered to be in the frequency range of 0-22.5 KHz. Loudspeaker 116 and microphone 118 may also operate at higher frequencies considered to be in the ultrasound frequency range. Microphone 118 may be integrated with endpoint 100 as shown in the example of FIG. 1, or may be positioned in room 101 at approximate locations of the user(s). Endpoint 100 may be a wired or a wireless communication device equipped with the aforementioned components, such as, but not limited to laptop and tablet computers, a smartphone, and the like. In a transmit direction, endpoint 100 captures sound/video from user 102 with microphone 118/VC 112, processes the captured sound/video into data packets, and transmits the processed data packets to other endpoints. In a receive direction, endpoint 100 decodes sound/video from data packets received from the other endpoints and presents the sound/video to user 102 via loudspeaker 116/display 114.

According to embodiments presented herein, endpoint 100 transmits into room 101 a sound signal 130 that may be used for pairing with user device 103, in which case the sound signal is referred to as a "pairing" signal. Sound signal 130 may convey/carry information to user device 103. For reasons that will be apparent from the description below, sound signal 130 may also be referred to as a "shaped" sound signal. Ideally, sound signal 130 has (i) a frequency spectrum that spans at least portions of the frequency range of human hearing so that user device 103 need only be equipped with a conventional sound microphone to detect the sound signal, and (ii) a level (i.e., sound level) that is as high as possible without being noticeable to user 102, so as not to irritate or distract the user. To achieve these goals, endpoint 100 generates sound signal 130 so that it has content across a frequency spectrum that spans at least a substantial portion of the frequency range of human hearing. In one example, the frequency spectrum spans the full range of human hearing. In another example, the frequency spectrum spans a more limited range from approximately 20 or 50 Hz up to approximately 18 or 20 KHz, although other examples of limited ranges are possible. In addition, endpoint 100 shapes (i.e., spectrally shapes) the frequency spectrum so that, at each frequency thereof, a level of the sound signal is approximately equal to either (i) a sound level of background noise detected in the room, or (ii) a sound threshold of human hearing (referred to as an auditory threshold of human hearing), whichever is greater.

Mathematically, endpoint 100 spectrally shapes sound signal 130 as a function of frequency f according to the following equation: output power(f)=max{noise power(f), hearing threshold(f)}. Where output power(f) is the power of sound signal 130 at frequency f, noise power(f) is an estimated power of the background noise in room 101 at frequency f, and hearing threshold(f) is the auditory threshold (i.e., sensitivity level) of human hearing at the frequency f. Such frequency-dependent shaping maximizes the level of sound signal 130 across the frequency range of human hearing, while rendering the sound signal largely imperceptible to human hearing because the level is either (i) substantially masked/hidden by the background noise if the background noise level exceeds the threshold of human hearing, or (ii) no higher than the threshold of human hearing if the threshold of human hearing exceeds the background noise level.

Figure 2:
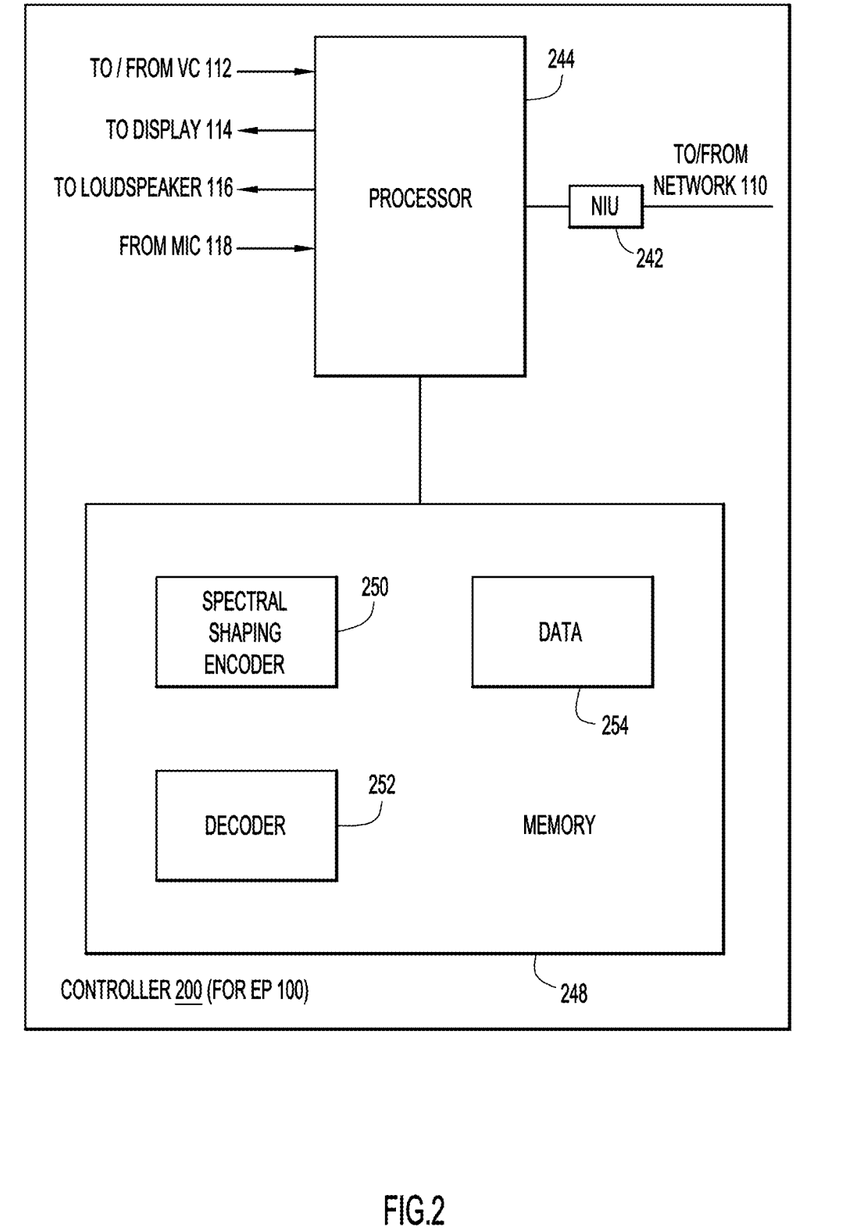
FIG. 2 is block diagram of a controller of the video conference endpoint, according to an example embodiment.

Reference is now made to FIG. 2, which shows an example block diagram of a controller 200 of endpoint 100 configured to implement the embodiments presented herein. There are numerous possible configurations for controller 200 and FIG. 2 is meant to be an example. Controller 200 includes a network interface (I/F) unit (NIU) 242, a processor 244, and memory 248. NIU 242 is, for example, an Ethernet card or other interface device having a connection port and that allows the controller 200 to communicate over a communication network via the connection port. NIU 242 may include wired and/or wireless connection capability. In a wireless embodiment, NIU 242 includes a wireless transceiver and an antennal to transmit and receive wireless communication signals to and from the communication network.

Processor 244 may include a collection of microcontrollers and/or microprocessors, for example, each configured to execute respective software instructions stored in the memory 248. The collection of microcontrollers may include, for example: a video controller to receive, send, and process video signals related to display 114 and video camera 112; a sound processor to receive, send, and process sound signals related to loudspeaker 116 and microphone (MIC) 118; and a high-level controller to provide overall control. Portions of memory 248 (and the instruction therein) may be integrated with processor 244 and the aforementioned video and sound controllers. In the transmit direction, processor 244 prepares sound/video captured by microphone 118/VC 112 for transmit, and causes the prepared data packets to be transmitted to the communication network. In a receive direction, processor 244 processes sound/video from data packets received from the communication network and causes the processed sound/video to be presented to local participant 102 via loudspeaker 116/display 114. Processor 244 also performs sound signal processing to implement embodiments directed to generating and spectral shaping of sound signal 130 as described herein. As used herein, the terms "audio" and "sound" are synonymous and interchangeably.

The memory 248 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 248 may comprise one or more computer readable storage media (e.g., a memory device) encoded with software comprising computer executable instructions and when the software is executed (by the processor 244) it is operable to perform the operations described herein. For example, the memory 248 stores or is encoded with instructions for a spectral shaping encoder 250 to generate the above-mentioned spectrally shaped sound signal, and a decoder 252 to decode sound.

In addition, memory 248 stores data 254 used and generated by spectral shaping encoder 350, including, but not limited to human hearing auditory thresholds, noise level estimates, filter coefficients, and detected sound samples, as described below.

Figure 3:
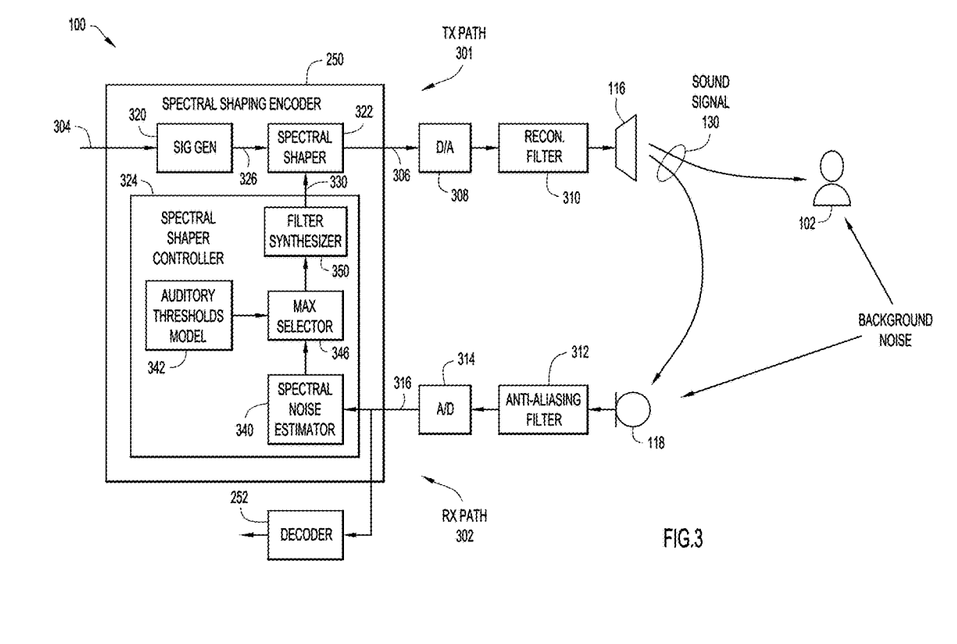
FIG. 3 there is a block diagram of the endpoint device showing details of transmit (TX) and receive (RX) paths of the endpoint device, according to an embodiment.

With reference to FIG. 3, there is a block diagram of endpoint 100 as deployed in room 102 showing details of a transmit (TX) path 301 and a receive (RX) path 302 of the endpoint, according to an embodiment. Transmit path 301 includes: spectral shaping encoder 250 to convert a digital signal 304 to a spectrally shaped, digitized sound signal 306 (which is a digitized representation of sound signal 130); a digital-to-analog (D/A) converter 308 following the spectral shaping encoder to convert digitized, spectrally shaped signal 306 to an analog or continuous-time signal; a reconstruction filter 310 following the D/A to filter the analog signal and provide a filtered version thereof to loudspeaker 116; and loudspeaker 116 to transmit the filtered signal into room 102 as sound signal 130. Receive path 302 includes: microphone 118 to detect sound in room 102; an anti-aliasing filter 312 to filter the detected sound; an analog-to-digital (A/D) converter 314 to convert the filtered, detected sound to a digitized sound signal 316 and to provide the digitized sound signal to spectral shaping encoder 250 and decoder 252; and decoder 252 to decode the digitized, detected sound signal.

In transmit path 301, spectral shaping encoder 250 includes a signal generator 320 (also referred to as a "core encoder" 320), a spectral shaper 322, and a spectral shaper controller 324. In the non-limiting example of FIG. 3, spectral shaping encoder 250 operates in the digital domain; however the signal processing components of the encoder may be implemented in analog circuitry. Signal generator 320 receives digital signal 304, e.g., a series of bits, and generates a (perceptually) white noise-like, information-carrying, signal 326 into which the bits are encoded, and which, once spectrally shaped, provides robust digital communication through a noisy and convolutive distorted channel. White noise-like signal 326 has a substantially flat (i.e., constant level) frequency spectrum spanning substantially the full frequency range of human hearing. In an example, signal generator 320 may generate signal 326 using a direct spread spectrum technique, e.g., using a binary non-return-to-zero (NRZ) encoded maximum-length sequence (MLS) for spreading a payload portion of signal 326 that carries information and a preamble portion of signal 326 that may be used for convolutive channel estimation at a decoder that receives the signal. A frame format of signal 326 including both of the preamble and payload portions is described below in connection with FIG. 4.

Following signal generator 320, spectral shaper 322 shapes the white noise-like spectrum of signal 326 based on a control signal 330 generated by spectral shaper controller 324 in the manner described below, to produce spectrally-shaped digitized sound signal 306 representative of sound signal 130. More specifically, spectral shaper 322 shapes the white noise-like frequency spectrum of sound signal 326 to produce a shaped frequency spectrum (of sound signal 306) having, for each frequency across the frequency range, a respective level that follows either (i) an auditory threshold of human hearing at that frequency, or (ii) a level of background noise at that frequency, whichever is greater. In other words, spectrally shaped sound signal 306 has a sound level that follows the greater of either the auditory threshold of human hearing or the level of background noise across the frequency range.

Following spectral shaper 322, D/A 308 and reconstruction filter 310 transform sound signal 306 to sound signal 130 such that sound signal 130 has substantially the same shaped frequency spectrum as sound signal 306.

In an embodiment, spectral shaper 322 includes a spectral shaping filter, such as a Finite Impulse Response (FIR) filter or an Infinite Impulse Response (IIR), having a frequency response that spectrally shapes white noise-like signal 326. Spectral shaper 322 may also include a programmable gain stage in series with the shaping filter to set a gain of the spectral shaper. This gain allows a perceptually sensible either increase of communication robustness or decrease of audibility through a single scalar parameter. The frequency response of the shaping filter may be determined by a set of filter coefficients generated by spectral shaper controller 324 and provided to the shaping filter via control signal 330, i.e., control signal 330 includes the filter coefficients derived by the spectral shaper controller. As described below, spectral shaper controller 324 derives the filter coefficients based in part on noise detected in room 101 and, therefore, the controller changes the filter coefficients responsive to detected noise changes. This in turn adapts the shaping filter to accommodate the noise changes. In this way, the shaping filter may be an adaptive shaping filter and the filter coefficients may be adaptive filter coefficients.

Spectral shaper controller 324 includes a spectral noise estimator 340, a human hearing auditory thresholds model 342, a maximum level selector 346, and a filter synthesizer 350 that cooperate to generate spectral shaping control signal 330 based on background noise in room 102 as detected by microphone 118 and the human hearing auditory threshold model, as is now described. Spectral noise estimator 340 receives detected sound signal 316 and estimates frequency-dependent noise levels in the detected sound signal, which are representative of background noise levels in room 102. More specifically, spectral noise estimator 340 estimates respective (sound) levels of noise at frequencies (e.g., at frequency points, or in frequency bins/narrow frequency subbands) across the frequency range of human hearing. Any known or hereafter developed technique for estimating noise may be used. For example, in one embodiment, spectral noise estimator 340 may (i) convert sound signal 316 to a frequency spectrum spanning the frequency range of human hearing using a Fast Fourier Transform (FFT), for example, and (ii) estimate a respective (sound) level of noise for each frequency of the frequency spectrum, e.g., in each frequency bin/narrow frequency subband of the FFT, across the frequency range. In an embodiment, spectral noise estimator 340 may use a so-called "minimum-statistics" method of estimating the sound level, which is robust against non-stationary speech. Spectral noise estimator 340 provides the estimated levels of noise for the corresponding frequencies to maximum level selector 346.

Human hearing auditory thresholds model 342 (also referred to simply as "auditory thresholds" model 342) stores a model or plot/curve of a frequency response of human hearing, i.e., auditory thresholds of human hearing across the frequency range of human hearing. For example, auditory thresholds model 342 may include a respective auditory threshold of human hearing for each frequency (or narrow frequency subband) of the frequency range of human hearing. Auditory thresholds model 342 provides the respective auditory thresholds for the frequencies to maximum level selector 346. Candidate models or plots that may be used for the auditory thresholds of human hearing are described below in connection with FIG. 5.

Maximum level selector 346 compares, at each frequency across the frequency range of human hearing, the estimated noise level (from spectral noise estimator 340) against the auditory threshold (from auditory threshold model 342) corresponding to that frequency and, based on the comparison, selects either the estimated noise level or the auditory threshold, whichever is greater (i.e., selects the maximum level of the estimated noise level and the auditory threshold). Maximum level selector 346 outputs to filter synthesizer 350 the selected maximum level for each frequency across the frequency range. The selected maximum levels across frequency that are output by maximum selector 346 represent a spectral shape (i.e., level vs. frequency) to be imposed on the white noise-like frequency spectrum of sound signal 326 by spectral shaper 322 such that the resulting spectral shape of sound signal 306/130 matches or follows the spectral shape output by the maximum level selector, i.e., at each frequency, the spectral shape of sound signal 306/130 follows either the auditory threshold or the level of background noise, whichever is greater.

Filter synthesizer 350 generates/derives the filter coefficients for the shaping filter of spectral shaper 322 that, when applied to the shaping filter, cause the shaping filter to have a frequency response (i.e., gain/loss vs. frequency) that follows the spectral shape output by maximum level selector 346. Filter synthesizer 350 derives the filter coefficients using any known or hereafter technique used to derive filter coefficients for a known type of filter based on a desired frequency response for that filter. Filter synthesizer 350 provides the filter coefficients to spectral shaper 322 via control signal 330. The shaping filter of spectral shaper 322 shapes the white noise-like spectrum of sound signal 326 according to the frequency response of the shaping filter.

It may be assumed that microphone 118 is a proxy for the hearing of user 102 and that the sound pressure level (SPL) detected at the microphone due to either background noise in room 101 or audio signal 130 is representative of the sound pressure level at the user. In the case of either noise or sound signal 130, the sound pressure level at microphone 118 may be estimated within each narrow frequency subband according to the following:

$\alpha$=0.01 (or some other fraction of 1);

y[n]=bandpassfilter(x[n]), n is a time or sequence number index, x[n] is the level input to spectral noise estimator 340, and y[n] is the estimated noise level; and sp[n]=$\alpha$*abs((y[n]+(1−$\alpha$))sp[n−1]), where sp[n] is the sound pressure at the microphone, where, if x[n] is in units of Sound Pressure [Pascal], the SPL is 20*log 10 (Sound Pressure/Reference Pressure).

Also, both transmit path 301 and receive path 302 may be calibrated such that a known sound pressure level transmitted by loudspeaker 116 results in a known sound pressure level at microphone 118 (and thus at user 102). Moreover, the sound levels represented by auditory thresholds model 342 and the frequency response of the shaping filter of spectral shaper 322 may also be referenced to the known calibrated levels such that a particular auditory threshold, or noise level, translates to a particular gain/attenuation of the frequency response that in turn results in a known sound pressure level being transmitted from loudspeaker 116.

Figure 4:
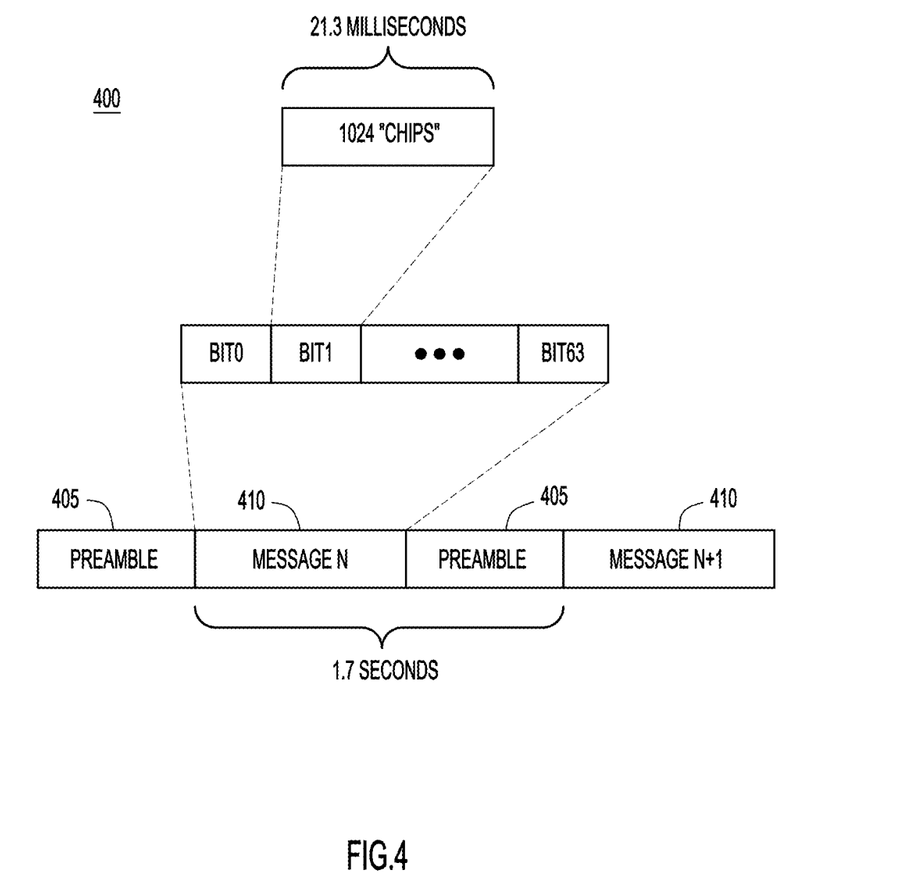
FIG. 4 is an illustration of a frame format for a sound signal transmitted from the endpoint device, according to an example embodiment.

With reference to FIG. 4, there is an illustration of a frame format 400 for sound signals 326, 306, and 130, as generated by signal generator 320. Frame format 400 includes a preamble 405 followed by a payload 410 carrying a message of N bits. In the example of FIG. 4, N=64, where each bit is spread using a spreading code of 1024 chips. In an example, signal generator 320 performs direct spreading at a sample rate of 48 KHz, where a chip rate is equal to the sample rate. These spreading parameters result in a message packet having 65536 samples for a duration of approximately 1.37 seconds. Signal generator 320 modulates each bit in payload 410 as + or −1024 "ones" multiplied by a chronologically increasing chunk of a larger length MLS of order 16 (i.e., $2^{16}$−1). Signal generator 320 modulates each bit of preamble 405 with a different MLS of order 14 (i.e., $2^{14}$−1). Appended preamble 405 and payload 410 represent a combined 81919 samples or approximately 1.7 seconds for a 37.5 bits/second rate. The periodic noise-like signal represented by frame format 400, having a periodicity of greater than 1 second (e.g., 1.7 seconds), conveys information, while sounding like white noise to human hearing. Other values of N, sample rate, and chip rate may be used.

As depicted in the example of FIG. 4, frame format 400 includes the sequence [preamble, payload1, preamble, payload2, . . . ]. Thus, the preamble is temporally multiplexed with the payload. Generally, the preamble will remain the same as it is used for receiver synchronization and channel estimation purposes, while the payload may change over time. Repeated payloads may be used, depending on how fast a given pairing system is required to detect that a user/user device has left the room.

Figure 5:
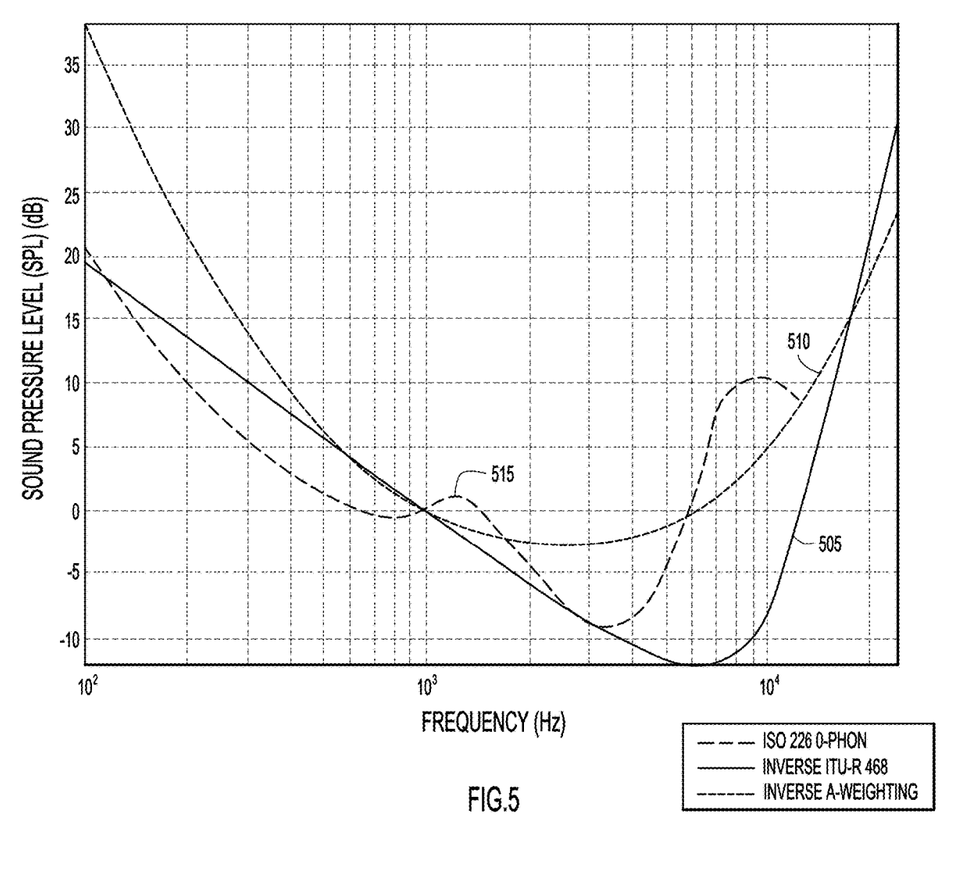
FIG. 5 shows predetermined models or curves for auditory thresholds of human hearing (i.e., frequency responses or sensitivities of human hearing) as developed by various audio standards bodies and that may be used by the endpoint device.

With reference to FIG. 5, there are shown predetermined models or plots/curves for auditory thresholds of human hearing (i.e., frequency responses or sensitivities of human hearing) as developed by various audio standards bodies and that may be used auditory thresholds model 342 or on which the model may be based. The illustrated models include an inverse International Telecommunication Union (ITU)-R 468 weighting curve 505 (which may be referenced to 0 dB SPL @ 1 kHz), an inverse A-weighting curve 510, and a predetermined International Organization for Standardization (ISO) 226 0-phon curve 515. Auditory thresholds curves 505-515 exhibit the following common characteristics: the curves span the frequency range of human hearing and low ultrasound from 0-25 KHz; each of the curves resembles a "hammock" shape having relatively high auditory thresholds in both a relatively low frequency subband (e.g., at relatively low frequencies of 0-1 KHz) and a relatively high frequency subband (e.g., relatively high frequencies of 10-25 KHz), and relatively low auditory thresholds that are lower than the relatively high auditory thresholds in a relatively mid-range frequency subband (e.g., mid-range frequencies of 1-10 KHz) between the low and high frequency subbands.

Figure 6:
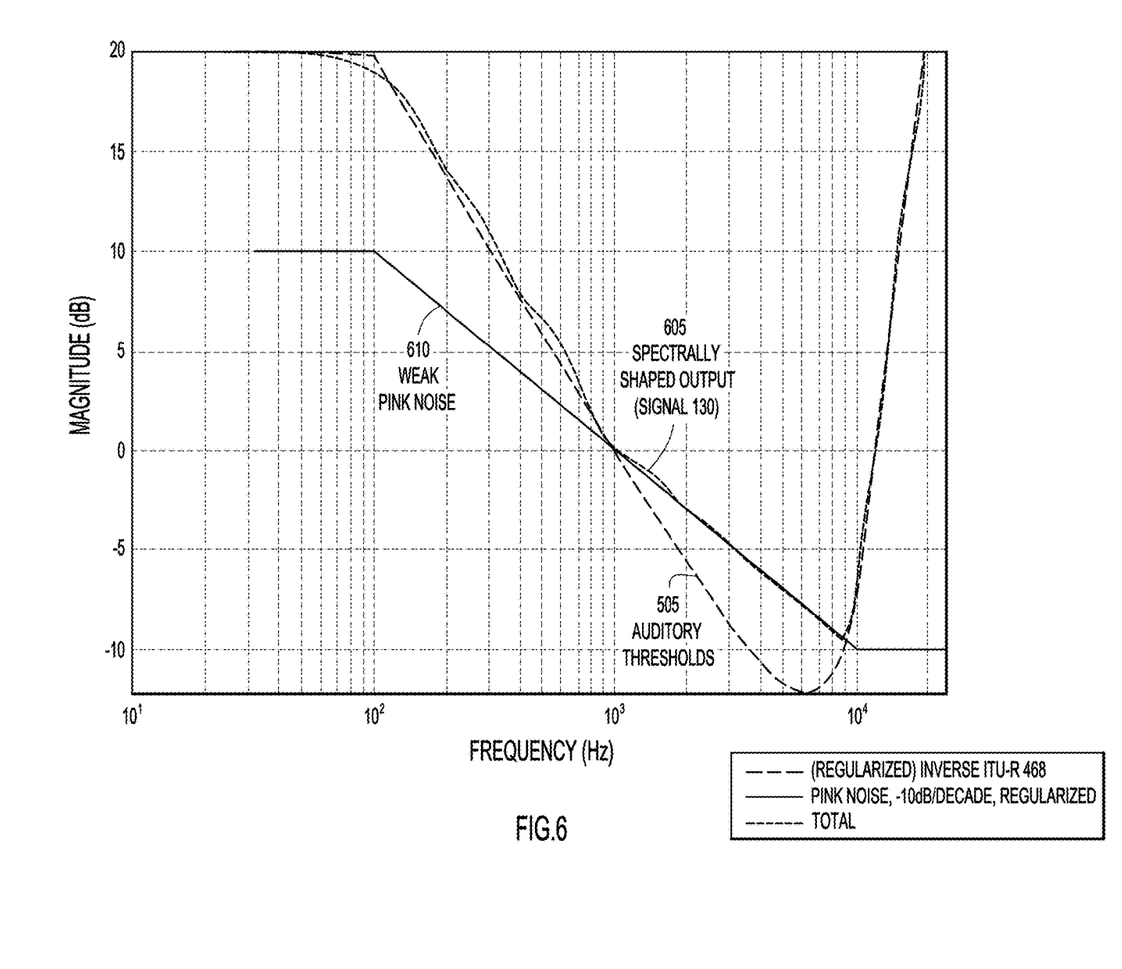
FIG. 6 shows a spectrally shaped sound signal produced by the endpoint device when the background noise levels in the room follow a "weak" pink noise spectral distribution, according to an example embodiment.

With reference to FIG. 6, there is shown an example (spectrally) shaped frequency spectrum 605 of sound signal 130 produced by spectral shaping encoder 250 when (i) auditory thresholds model 342 uses ITU-R 468 weighting curve 505, and (ii) the background noise levels in room 102 follow a "weak" pseudo-pink noise spectral distribution or spectrum 610. Shaped frequency spectrum 605 also represents the frequency response of spectral shaper 322, e.g., the frequency response of the shaping filter of the spectral shaper. Pink noise or 1/f noise (where f is frequency) has equal energy in all octaves and, in terms of power at constant bandwidth, falls off at 3 dB per octave. The pink noise represents an example of a more general case of colored noise or 1/$f^\beta$ noise, where $\beta$ can take any value greater than or equal to 1. The frequency spectrum of the colored noise (including the pink noise) generally follows a low pass filter shape (i.e., follows the shape of the frequency response of a low pass filter).

In a low frequency range from below 100 Hz to 1 KHz in which the auditory thresholds of auditory thresholds curve 505 exceed the noise levels given by weak pink noise spectrum 610, the levels of shaped frequency spectrum 605 follow, i.e., match or are substantially equal to, the auditory thresholds rather than the noise levels. In a middle frequency range from 1 KHz to nearly 10 KHz in which the noise levels exceed the auditory thresholds, the levels of shaped frequency spectrum 605 follow pink noise spectrum 610 rather than the auditory thresholds. In a high frequency range above 10 KHz in which the auditory thresholds again exceed the noise levels, the levels of shaped frequency spectrum 605 follow the auditory thresholds. In summary, given a room environment in which the background noise level follows weak pink noise spectrum 610, spectral shaping encoder 250 spectrally shapes output signal 130 in low, middle, and high frequency subbands of the frequency range of human hearing to follow auditory thresholds, pink noise levels, and then auditory thresholds again, respectively. Pink noise spectrum 610 is considered "weak" because the auditory thresholds dominate over the noise for most of the output spectrum of audio signal 130. In other words, being limited by his or her auditory thresholds, a human listener would be unable to perceive acoustic noise over large portions of the human auditory spectrum.

Figure 7:
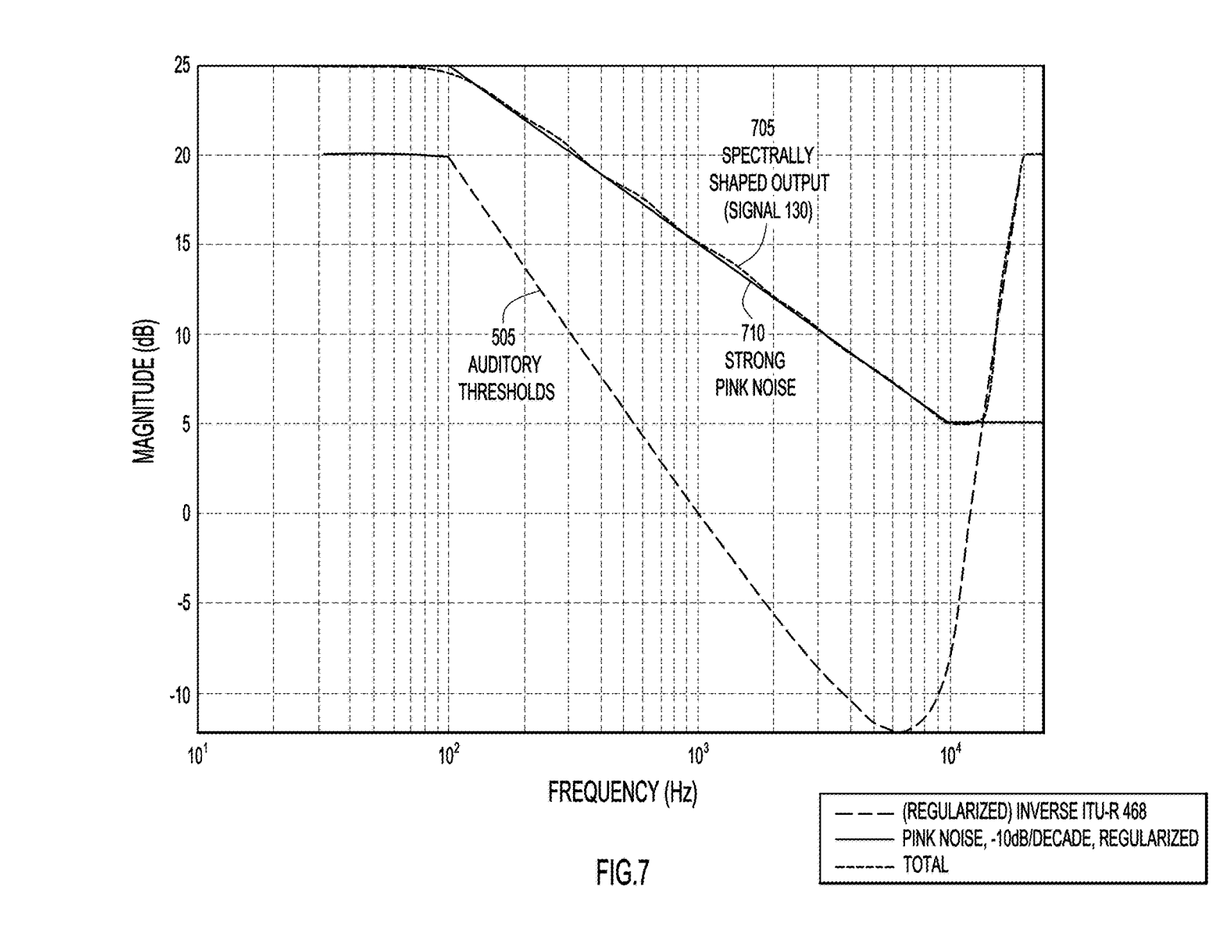
FIG. 7 shows a shaped frequency spectrum of a sound signal produced by the endpoint device when the background noise levels in the room follow a "strong" pink noise spectral distribution, according to an example embodiment.

With reference to FIG. 7, there is shown an example shaped frequency spectrum 705 of sound signal 130 produced by spectral shaping encoder 250 when (i) auditory thresholds model 342 uses ITU-R 468 weighting curve 505, and (ii) the background noise levels in room 102 follow a "strong" pink noise spectral distribution or spectrum 710. Shaped frequency spectrum 705 also represents the frequency response of spectral shaper 322, e.g., the frequency response of the shaping filter of the spectral shaper. Strong pink noise spectrum 710 is similar to weak pink noise spectrum 610, except that the noise levels of the strong pink noise spectrum are all increased by 15 dB relative to those of the weak pink noise spectrum.

In a low frequency range from below 100 Hz to approximately 14 KHz in which the noise levels exceed the auditory thresholds, shaped frequency spectrum 705 follows pink noise spectrum 710. In a high frequency range above 14 KHz in which the auditory thresholds exceed the noise levels, shaped frequency spectrum 705 follows the auditory thresholds. In summary, given a room environment in which the background noise level follows strong pink noise spectrum 710, spectral shaping encoder 250 spectrally shapes sound signal 130 in low and high frequency subbands of the frequency range of human hearing so as to follow noise levels and then auditory thresholds, respectively. Pink noise spectrum 710 is considered "strong" because the noise levels dominate over the auditory thresholds for most of the spectrum of audio signal 130.

While FIGS. 6 and 7 show pink noise spectrums, room noise may follow other types of noise spectrums.

As mentioned above, the embodiment of spectral shaping encoder 250 depicted in FIG. 3 is adaptive because it automatically adjusts to different noise levels/frequency spectrums in room 101. In another embodiment, the spectral shaping encoder may use a shaping filter having a static frequency response based on an assumption of a noise spectrum for a room environment. In the static embodiment, the noise may be assumed to be one of weak pink (e.g., as shown in FIG. 6), strong pink (as shown in FIG. 7), or an intermediate-level pink and, therefore, the filter coefficients are derived and programmed into the shaping filter for the assumed noise spectrum, so that the shaping filter has a static frequency response corresponding to the assumed noise spectrum. An example of a static frequency response is described below in connection with FIG. 8. In yet another embodiment, endpoint 100 may be configured to (i) enable manual selection by a user of any of multiple predetermined noise spectrums, and, in response to a selection, program the frequency response of the shaping filter accordingly using a corresponding set of filter coefficients, for example.

Figure 8:
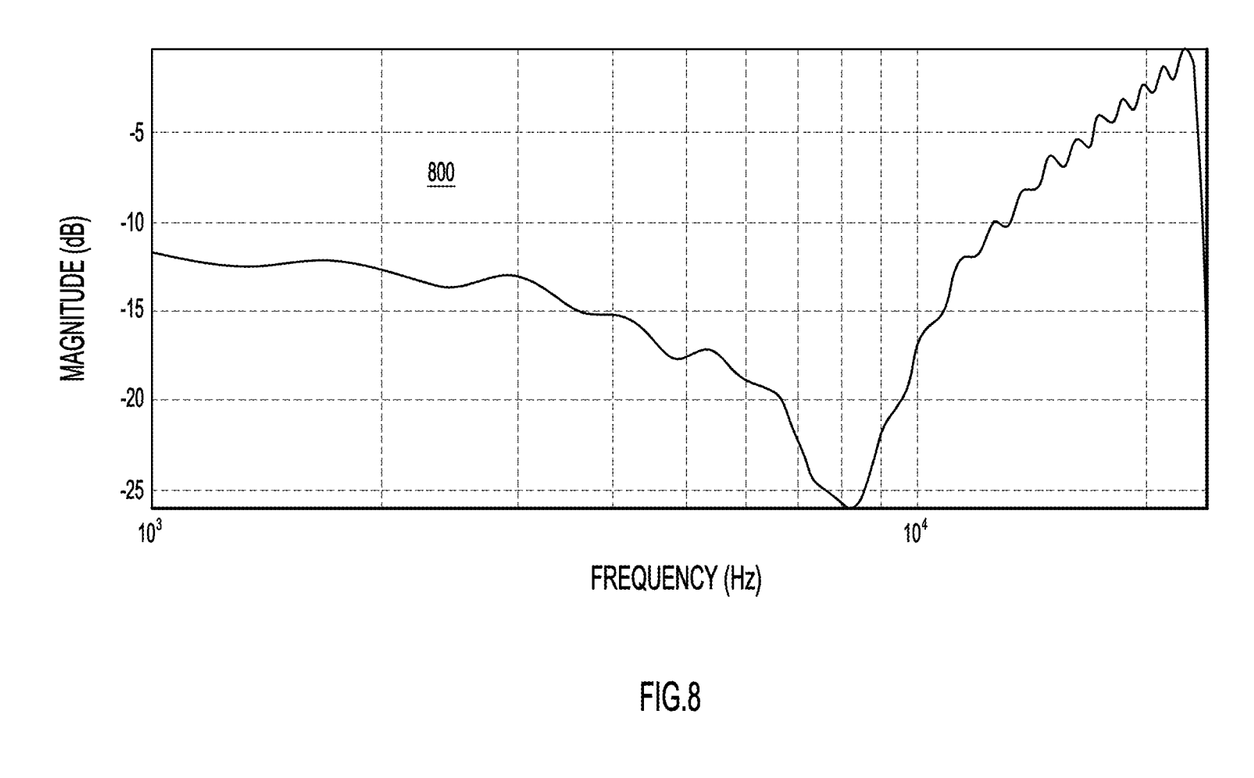
FIG. 8 is an illustration of a static frequency response for a shaping filter of a spectral shaper in the endpoint device, according to an example embodiment.

With reference to FIG. 8, there is shown an example static frequency response 800 for the shaping filter of spectral shaper 322. An FIR filter having a number N taps (filter coefficients) may be programmed to have frequency response 800. In an example, the number N of taps may include many taps, such as 100 taps or more; however, for convenience, less taps may be used to generate a rough approximation of frequency response 800. Frequency response 800 exhibits cascaded frequency responses including those of a low pass filter up 8 KHz, a notch filter centered about 8 KHz, and a high pass filter above 8 KHz. Frequency response 800 also includes an anti-aliasing notch centered at 24 KHz, which is half of the sampling/chip rate. Frequency response 800 reflects typical room environments in which noise dominates lower frequencies and auditory thresholds dominate higher frequencies, that is, noise dominates the frequency response up to the notch, while auditory thresholds dominate the frequency response at the notch and at frequencies above notch.

Figure 9:
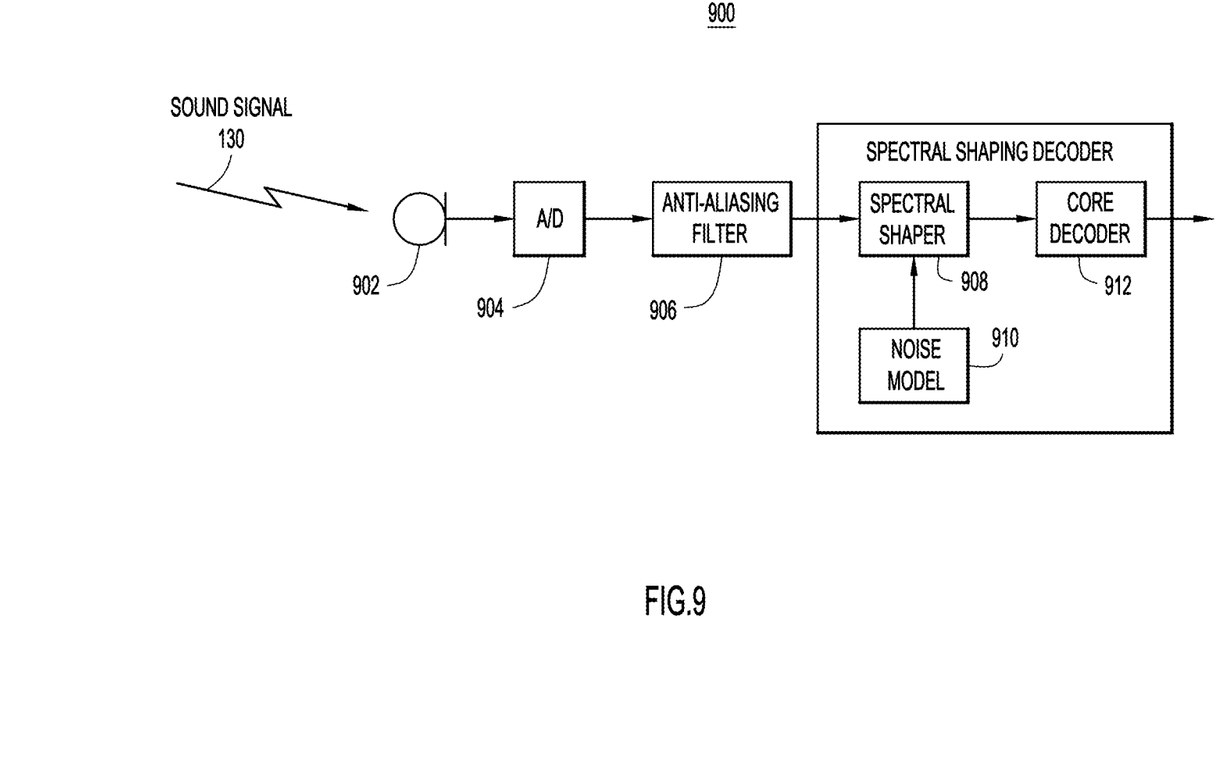
FIG. 9 is a block diagram of a receiver capable of receiving and processing/decoding the sound signal transmitted by the endpoint device, according to an example embodiment.

With reference to FIG. 9, there is a block diagram of an example receiver 900 capable of receiving and processing/decoding sound signal 130. Receiver 900 may be implemented in user device 103, for example. Receiver 130 includes: a microphone 902 to detect sound signal 130; an A/D 904 to digitize the detected sound signal; an anti-aliasing filter 906 to filter the digitized sound signal; a spectral shaper 908 to spectrally shaped the filtered digitized sound signal based on information from a noise model 910; and a core decoder 912 to decode the spectrally shaped signal. Spectral shaper 908, noise model 910, and core decoder 912 collectively represent a spectral shaping decoder 914. Spectral shaper 908 may include a high pass filter to reduce the influence of, typically low-frequency dominated, stationary background noise as well as, typically low-frequency dominated, highly non-stationary in-room speech. The filter may introduce on the order of 20-40 dB of attenuation at direct current (DC) frequencies, while smoothly transitioning to 0 dB gain at 0.5 times the Nyquist frequency.

Figure 10:
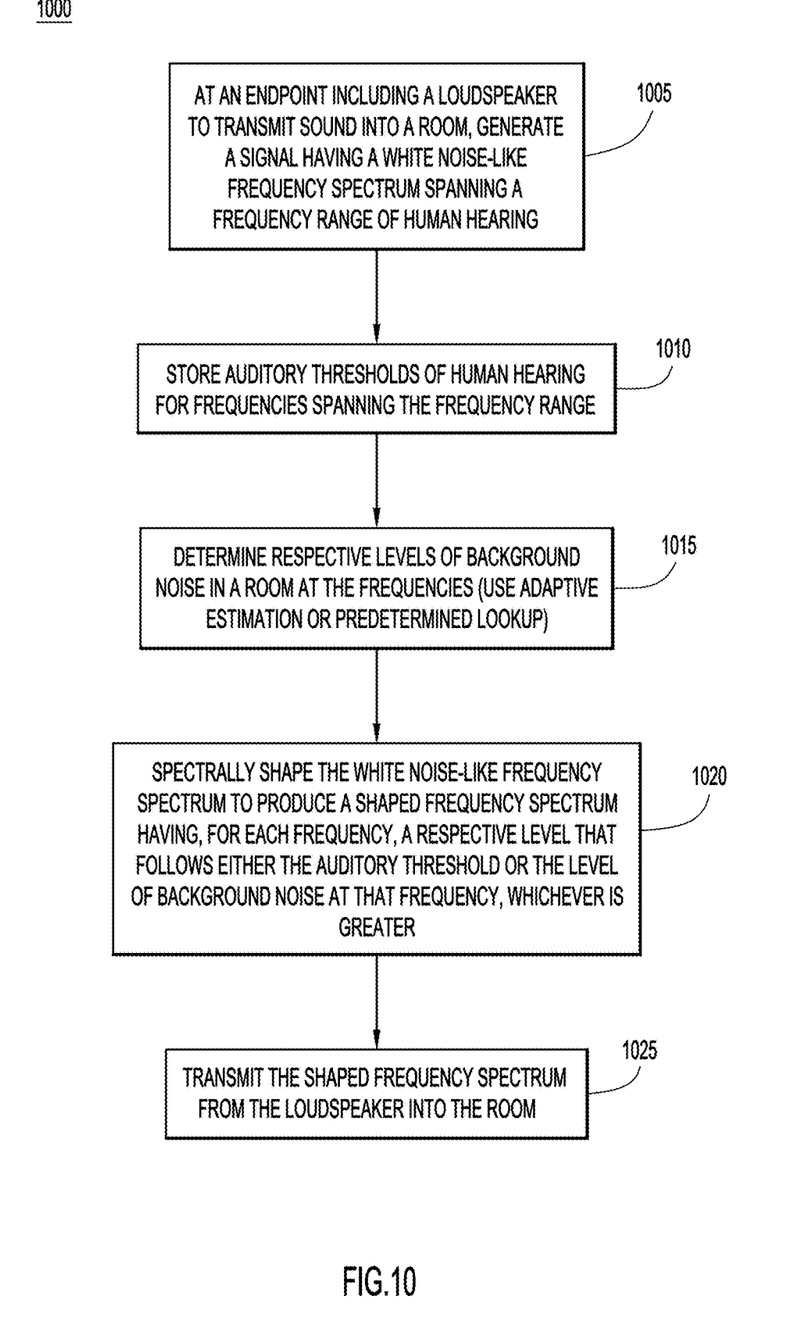
FIG. 10 is a flowchart of a summary method of generating spectrally shaped sound performed by the endpoint device.

With reference to FIG. 10, there is a flowchart of an example method 1000 of generating a spectrally shaped sound performed by a communication device, such as endpoint 100. Method 1000 summarizes operations described above.

At 1005, endpoint 100 (e.g., controller 200) generates sound signal 326 having the white noise-like frequency spectrum spanning at least a portion of the frequency range of human hearing.

At 1010, endpoint 100 (e.g., controller 200) stores auditory/sound thresholds of human hearing model 342 for various frequencies (e.g., frequency points, bins, or narrow subbands) spanning the frequency range. For example, endpoint 100 stores a respective auditory/sound threshold corresponding to each of the frequencies.

At 1015, endpoint 100 (e.g., controller 200) determines respective levels of background noise in room 101 at the various frequencies. Endpoint 100 may determine the levels of background noise adaptively as described above in connection with FIG. 3, or may access the levels from a predetermined noise spectrum, e.g., plot of noise levels vs. frequency. For example endpoint 100 determines a respective level of background noise corresponding to each of the frequencies.

At 1020, endpoint 100 (e.g., controller 200) spectrally shapes the white noise-like frequency spectrum of signal 326 to produce a signal (e.g., signal 306, 130) having a shaped frequency spectrum. The shaped frequency spectrum has, for/at each frequency across the shaped frequency spectrum, a respective level that follows either the auditory threshold or the level of background noise at that frequency, whichever is greater. In the adaptive embodiment, the spectral shaping adapts to different room noise spectrums over time based on the adaptive noise determination in operation 1015. In a static embodiment, the spectral shaping may be static, and based on a predetermined noise level spectrum accessed in operation 1015, such as a pink noise spectrum. Spectral shaping may be implemented in the time domain (e.g., by filtering time domain samples using an FIR filter) or, alternatively, in the frequency domain (e.g., by manipulating frequency domain samples produced by an FFT) to achieve the same end result, i.e., a shaped frequency spectrum.

At 1025, endpoint 100 transmits signal 130 having the shaped frequency spectrum from loudspeaker 106 into the room (e.g., controller 200 causes signal 130 to be transmitted from loudspeaker 106).

Table 1 below formalizes trade-offs between communication conditions and perceptual conditions that results when using the embodiments described herein. The trade-offs assume similar acoustic conditions at the microphones used in the endpoint and at the users.

TABLE 1

|  | Communication Signal-to-Noise Ratio (SNR) | Human Perceptibility |
| --- | --- | --- |
| Noise Dominated Spectral Bands | 0 dB SNR | +3 dB |
| Audibility Thresholds Dominated Spectral Bands | >0 dB SNR | None |

As seen in Table 1:

a. A perceptual "price to pay" or degradation using the embodiments is (only) a rise in perceived noise levels of (at most) +3 dB, in frequency bands that are dominated by acoustic noise. In bands that are dominated by human audibility, there is no perceptual price to pay.

b. A (digital) communication opportunity or improvement that is gained across the frequencies using the embodiments is some bands with 0 dB SNR (noise-dominated bands) and others with >0 dB (human audibility dominated bands).

In summary, in one form, a method is provided comprising: at a communication device having a loudspeaker to transmit sound into a room: generating a signal having a white noise-like frequency spectrum spanning a frequency range of human hearing; storing auditory thresholds of human hearing for respective frequencies spanning the frequency range; determining levels of background noise in the room at the respective frequencies; spectrally shaping the white noise-like frequency spectrum to produce a shaped frequency spectrum having, for each frequency, a respective level that follows either the auditory threshold or the level of background noise at that frequency, whichever is greater; and transmitting the shaped frequency spectrum from the loudspeaker into the room.

In summary, in another form, an apparatus is provided comprising: a loudspeaker to transmit sound into a room; a controller coupled to the loudspeaker and configured to: generate a signal having a white noise-like frequency spectrum spanning a frequency range of human hearing; store auditory thresholds of human hearing for respective frequencies spanning the frequency range; determine levels of background noise in the room at the respective frequencies; spectrally shape the white noise-like frequency spectrum to produce a shaped frequency spectrum having, for each frequency, a respective level that follows either the auditory threshold or the level of background noise at that frequency, whichever is greater; and cause the loudspeaker to transmit the shaped frequency spectrum into the room.

In summary, in yet another form, a processor readable medium is provided to store instructions that, when executed by a processor, cause the processor to perform the method described herein. In an example, a non-transitory computer-readable storage media encoded with software comprising computer executable instructions and when the software is executed, by a controller of a communication device having a loudspeaker to transmit sound into a room, operable to: generate a signal having a white noise-like frequency spectrum spanning a frequency range of human hearing; store auditory thresholds of human hearing for respective frequencies spanning the frequency range; determine levels of background noise in the room at the respective frequencies; spectrally shape the white noise-like frequency spectrum to produce a shaped frequency spectrum having, for each frequency, a respective level that follows either the auditory threshold or the level of background noise at that frequency, whichever is greater; and cause the loudspeaker to transmit the shaped frequency spectrum into the room.

The above description is intended by way of example only. Various modifications and structural changes may be made therein without departing from the scope of the concepts described herein and within the scope and range of equivalents of the claims.

What is claimed is:

1. A method comprising:
   at a communication device having a loudspeaker to transmit sound into a room and detecting the sound using a microphone in the room;
   generating a digitally encoded information carrying signal, using a signal generator, into which bits are encoded and having a substantially flat frequency spectrum spanning a substantially full frequency range of human hearing;
   storing auditory thresholds of human hearing for respective frequencies spanning the frequency range of human hearing;
   anti-aliasing filtering the detected sound to produce a filtered detected sound;
   determining levels of background noise, using a controller, in the room at the respective frequencies based on the filtered detected sound;
   spectrally shaping, using said controller, the substantially flat frequency spectrum of the filtered detected sound to produce a shaped frequency spectrum having, for each frequency, a respective level that is either the auditory threshold of human hearing or the level of background noise at that frequency, whichever is greater, wherein the spectrally shaping includes comparing at each frequency across the frequency range of human hearing the level of background noise at that frequency against the auditory threshold of human hearing corresponding to that frequency and, based on the comparison, selecting at each frequency as the respective level the greater of the auditory threshold of human hearing or the level of background noise at that frequency; and
   transmitting an encoded spectrally shaped filtered detected sound having said shaped frequency spectrum from the loudspeaker into the room.

2. The method of claim 1, wherein the determining the levels of background noise includes:
   estimating the levels of background noise at the frequencies from the filtered detected sound.

3. The method of claim 1, wherein the spectrally shaping further includes:
   deriving filter coefficients based on the determined levels of the background noise and the auditory thresholds of human hearing; and filtering the digitally encoded information carrying signal with a shaped frequency response that is based on the filter coefficients to produce the shaped frequency spectrum.

4. The method of claim 1, wherein the determining the levels of background noise includes:
   storing the levels of background noise as predetermined levels of background noise as an approximation of background noise in the room; and
   accessing the predetermined levels of the background noise.

5. The method of claim 1, wherein:
   the auditory thresholds of human hearing follow a hammock-shaped frequency response over the frequency range; and
   the background noise has a frequency spectrum approximating a low pass filter response over the frequency range.

6. The method of claim 5, wherein the spectrally shaping includes spectrally shaping so that the shaped frequency spectrum has a shape that follows:
   the low pass filter response at frequencies of the frequency range in which the noise levels dominate over the auditory thresholds of human hearing; and
   the hammock-shaped frequency response at frequencies of the frequency range in which the auditory thresholds of human hearing dominate over the noise levels.

7. The method of claim 5, wherein the auditory thresholds of human hearing are based on an inverse predetermined International Telecommunication Union (ITU)-R 468 weighting curve, an inverse predetermined A-weighting curve, or a predetermined International Organization for Standardization (ISO) 226 0-phon curve.

8. The method of claim 5, wherein the frequency spectrum approximates a pink noise frequency spectrum.

9. The method of claim 5, wherein:
   the auditory thresholds of human hearing of the hammock-shaped frequency response include relatively high auditory thresholds at high and low frequency subbands of the frequency range and relatively low auditory thresholds that are lower than the relatively high auditory thresholds in a mid-range frequency subband of the frequency range between the high and low frequency subbands; and
   the background noise frequency spectrum approximating, the low pass filter response includes a relatively flat portion coinciding with the low frequency subband of the frequency range and a low frequency roll-off portion coinciding with the mid-range frequency band of the frequency range.

10. The method of claim 1, wherein the generating includes generating the digitally encoded information carrying signal as a spread spectrum signal.

11. An apparatus comprising:
   a loudspeaker to transmit sound into a room and a microphone to detect sound in the room; and
   a controller coupled to the loudspeaker and configured to:
   generate a digitally encoded information carrying signal, using a signal generator, into which bits are encoded and having a substantially flat frequency spectrum spanning a substantially full frequency range of human hearing;
   store auditory thresholds of human hearing for respective frequencies spanning the frequency range of human hearing;
   anti-aliasing filter the detected sound in the room to produce a filtered detected sound;
   determine levels of background noise in the room at the respective frequencies based on the filtered detected sound;
   spectrally shape the substantially flat frequency spectrum of the filtered detected sound to produce a shaped frequency spectrum having, for each frequency, a respective level that is either the auditory threshold of human hearing or the level of background noise at that frequency, whichever is greater, wherein the controller is configured to spectrally shape the substantially flat frequency spectrum of the filtered detected sound by comparing at each frequency across the frequency range of human hearing the level of background noise at that frequency against the auditory threshold of human hearing corresponding to that frequency and, based on the comparison, selecting at each frequency as the respective level the greater of the auditory threshold of human hearing or the level of background noise at that frequency; and
   cause the loudspeaker to transmit an encoded spectrally shaped filtered detected sound having said shaped frequency spectrum.

12. The apparatus of claim 11, wherein the controller is configured to determine the levels of background noise by:
   estimating the levels of background noise at the frequencies from the filtered detected sound.

13. The apparatus of claim 11, wherein:
   the auditory thresholds of human hearing follow a hammock-shaped frequency response over the frequency range; and
   the background noise has a frequency spectrum approximating a low pass filter response over the frequency range.

14. The apparatus of claim 13, wherein the controller is configured to spectrally shape so that the shaped frequency spectrum has a shape that follows:
   the low pass filter response at frequencies of the frequency range in which the noise levels dominate over the auditory thresholds of human hearing; and
   the hammock-shaped frequency response at frequencies of the frequency range in which the auditory thresholds of human hearing dominate over the noise levels.

15. The apparatus of claim 13, wherein:
   the auditory thresholds of human hearing of the hammock-shaped frequency response include relatively high auditory thresholds at high and low frequency subbands of the frequency range and relatively low auditory thresholds that are lower than the relatively high auditory thresholds in a mid-range frequency subband of the frequency range between the high and low frequency subbands; and
   the background noise frequency spectrum approximating the low pass filter response includes a relatively flat portion coinciding with the low frequency subband of the frequency range and a low frequency roll-off portion coinciding with the mid-range frequency band of the frequency range.

16. A non-transitory computer-readable storage media encoded with software comprising computer executable instructions and when the software is executed, by a controller of a communication device having a loudspeaker to transmit sound into a room and a microphone to detect sound in the room, operable to:
   generate a digitally encoded information carrying signal into which bits are encoded and having a substantially flat frequency spectrum spanning a substantially full frequency range of human hearing;
   store auditory thresholds of human hearing for respective frequencies spanning the frequency range of human hearing;
   anti-aliasing filter the detected sound in the room to produce a filtered detected sound;
   determine levels of background noise in the room at the respective frequencies based on the filtered detected sound;
   spectrally shape the substantially flat frequency spectrum of the filtered detected sound to produce a shaped frequency spectrum having, for each frequency, a respective level that is either the auditory threshold of human hearing or the level of background noise at that frequency, whichever is greater, wherein the instructions operable to spectrally shape include instructions operable to compare at each frequency across the frequency range of human hearing the level of background noise at that frequency against the auditory threshold of human hearing corresponding to that frequency and, based on the comparison, select at each frequency as the respective level the greater of the auditory threshold of human hearing or the level of background noise at that frequency; and cause the loudspeaker to transmit an encoded spectrally shaped filtered detected sound having said shaped frequency spectrum into the room.

17. The computer-readable storage media of claim 16, wherein the instructions operable to determine the levels of background noise include instructions operable to:

estimate the levels of background noise at the frequencies from the filtered detected sound.

18. The computer-readable storage media of claim 16, wherein:

the auditory thresholds of human hearing follow a hammock-shaped frequency response over the frequency range; and the background noise has a frequency spectrum approximating a low pass filter response over the frequency range.

19. The computer-readable storage media of claim 18, wherein the instructions operable to spectrally shape include instructions operable to spectrally shape so that the shaped frequency spectrum has a shape that follows:

the low pass filter response at frequencies of the frequency range in which the noise levels dominate over the auditory thresholds of human hearing; and the hammock-shaped frequency response at frequencies of the frequency range in which the auditory thresholds of human hearing dominate over the noise levels.

* * * * *

UNITED STATES PATENT AND TRADEMARK OFFICE
CERTIFICATE OF CORRECTION

| | |
|---|---|
| PATENT NO. | : 9,837,064 B1 |
| APPLICATION NO. | : 15/205053 |
| DATED | : December 5, 2017 |
| INVENTOR(S) | : Knut Inge Hvidsten et al. |

Page 1 of 1

It is certified that error appears in the above-identified patent and that said Letters Patent is hereby corrected as shown below:

In the Claims

Claim 1, Column 12, Line 11, please replace "room;" with --room:--

Claim 9, Column 13, Line 28, please replace "approximating," with --approximating--

Signed and Sealed this
Fifth Day of February, 2019

Andrei Iancu
*Director of the United States Patent and Trademark Office*